United States Patent [19]

Senoo et al.

[11] Patent Number: 5,320,987
[45] Date of Patent: Jun. 14, 1994

[54] OPTICAL GLASS

[75] Inventors: Tatsuya Senoo; Katsuhiko Yamaguchi; Muneo Nakahara, all of Sagamihara, Japan

[73] Assignee: Kabushiki Kaisha Ohara, Kanagawa, Japan

[21] Appl. No.: 957,399

[22] Filed: Oct. 6, 1992

[51] Int. Cl.$^5$ .............................. C03C 3/078
[52] U.S. Cl. ........................ 501/72; 501/903
[58] Field of Search ................... 501/903, 72

[56] References Cited

U.S. PATENT DOCUMENTS 3,589,918 6/1971 Jahn .................... 501/903 X
4,526,874 7/1985 Grabowski geb. Marszalek et al. .................... 501/903 X
4,812,423 3/1989 Kodama et al. ............. 501/903 X

FOREIGN PATENT DOCUMENTS 0001087 1/1973 Japan ..................... 501/903

Primary Examiner—Karl Group
Attorney, Agent, or Firm—Hedman, Gibson & Costigan

[57] ABSTRACT

An optical glass which is a $SiO_2$—$TiO_2$—$K_2O$—RO (where R represents Mg, Ca, Sr, Ba and Zn metal elements) system glass of a specific content range exhibits optical constants of a refractive index (Nd) of about 1.58-1.78 and Abbe number ($\nu d$) of about 28-45, is free of PbO and has an improved property against devitrification.

1 Claim, No Drawings

OPTICAL GLASS

BACKGROUND OF THE INVENTION

This invention relates to an optical glass of a $SiO_2$—$TiO_2$—$K_2O$—RO (where R represents Mg, Ca, Sr, Ba and Zn metal elements) system which is free of PbO, has an excellent property against devitrification and has optical constants of a refractive index (Nd) of about 1.58–1.75 and Abbe number ($\nu d$) of about 28–45.

As a glass having the above mentioned optical constants, there is known a silicate glass containing PbO. For coping with environmental problems arising in the process of manufacturing a glass, however, various glasses which do not contain a toxic PbO ingredient but instead contain a $TiO_2$ ingredient have been proposed. For example, the specification of German Patent No. 973350 discloses a silicate glass containing $TiO_2$ and fluorine and the specification of Japanese Laid Open Patent Publication No. Sho 54-105119 discloses a $SiO_2$—$TiO_2$—$K_2O$—$BPO_4$ and/or $Al(PO_3)_3$ system glass. These glasses, however, are insufficient in stability against devitrification. Besides, the former glass is hard to homogenize in melting due to evaporation of the fluorine ingredient. The specification of U.S. Pat. No. 4,812,423 discloses a glass of a $SiO_2$—$TiO_2$—$Li_2O$—$K_2O$ system. This glass, however, is also insufficient in stability against devitrification.

It is, therefore, an object of the invention to comprehensively improve the disadvantages of the prior art optical glasses and provide an optical glass having the above mentioned optical constants and having an improved property against devitrification.

SUMMARY OF THE INVENTION

Accumulated studies and experiments made by the inventors of the present invention for achieving the above described object of the invention have resulted in a finding, which has led to the present invention, that a desired glass which, while maintaining the above mentioned optical constants, is remarkably improved in the property against devitrification and can be manufactured in a mass scale can be obtained in a novel $SiO_2$—$TiO_2$—$K_2O$—RO system glass of a specific content range.

The optical glass achieving the above described object of the invention is characterized in that the glass comprises in weight percent:

| | |
|---|---|
| $SiO_2$ | 46–65% |
| $TiO_2$ | 21–30% |
| $Na_2O + K_2O$ | 10–30% |
| in which $Na_2O$ | 0–25% |
| $K_2O$ | 5–30% |
| $MgO + CaO + SrO + BaO + ZnO$ | 2–15% |
| in which $MgO + CaO$ | 0–4% |
| and in which MgO | 0–4% |
| CaO | 0–4% |
| SrO | 0–10% |
| BaO | 0–15% |
| ZnO | 0–10% | and has a refractive index (Nd) of about 1.58–1.75 and Abbe number ($\nu d$) of about 28–45.

DETAILED DESCRIPTION OF THE INVENTION

In the optical glass made according to the invention, the above described content ranges of the respective ingredients have been selected for the reasons stated below. In the following description, the content range of the respective ingredients are expressed in weight percent.

The $SiO_2$ ingredient is useful as a glass forming oxide. If the amount of this ingredient is below 46%, light transmissivity and chemical durability of the glass are deteriorated. If the amount exceeds 65%, difficulty arises in melting of the glass. The $TiO_2$ ingredient is effective for imparting the glass with a high dispersion property. If the amount is below 21%, the refractive index drops and dispersion is reduced. If the amount exceeds 30%, light transmissivity and stability of the glass are deteriorated. For improving the melting property of the glass, the $Na_2O$ ingredient may be added up to 25% which is the limit at which deterioration of chemical durability can be prevented. The $K_2O$ ingredient is an important ingredient because it is effective for improving the melting property and stability of the glass. If the amount is below 5%, a sufficient effect cannot be obtained. If the amount exceeds 30%, chemical durability of the glass is deteriorated. The total amount of $Na_2O$ and $K_2O$ should be within a range of 10–30% for maintaining the melting property and stability of the glass.

The MgO, CaO, SrO, BaO and ZnO ingredients are important for maintaining the above mentioned optical constants and improving the melting property, stability and light transmissivity of the glass and one or more of these ingredients should be added to the glass. For achieving these properties, it will suffice if the respective ingredients are added up to 4%, 4%, 10%, 15% and 10%, respectively. If, however, the total amount of MgO and CaO exceeds 4%, light transmissivity is deteriorated. For achieving the desired effects, it is necessary to add one or more of MgO, CaO, SrO, BaO and ZnO in the total amount of 2% or over. If, however, the total amount of these ingredients exceeds 15%, dispersion of the glass is reduced with resulting difficulty in maintaining the desired optical constants.

For purposes including adjusting of the optical constants and improving of the melting property and chemical durability, $Al_2O$ and $ZrO_2$ may be added, if necessary, up to about 2% respectively, and $WO_3$ up to about 5%, within a range in which properties of the glass will not be deteriorated. $As_2O_3$ and $Sb_2O_3$ may also be added as a refining agent up to about 1% respectively.

EXAMPLES

Examples of the optical glass according to the invention will now be described.

Table 1 shows compositions of the examples (No. 1–No. 12) of the optical glass made according to the invention and compositions of comparative examples of the prior art glasses (No. A, No. B and No. C) as well as results of measurement of refractive index (Nd), Abbe number ($\nu d$) and temperature in liquid phase (° C.) of these glasses.

These glasses were obtained by preparing and mixing normal raw materials used for manufacturing optical glasses and melting the mixture of the raw materials in a platinum crucible, stirring the mixture to homogenize it, casting it in a mold to form a block of glass and annealing the block of glass.

The liquid phase temperature shown in Table 1 was obtained by crushing the glass obtained by the above described process, placing the crushed glass on a platinum plate and holding it in a temperature gradient furnace for 30 minutes and microscopically observing the state of devitrification.

As shown in Table 1, the glasses Nos. A, B and C exhibit high liquid phase temperatures whereas the glasses of the present invention exhibit low liquid phase temperature, indicating an improved property against devitrification and thereby indicating that the object of the invention has been achieved.

Measurement was made about wavelengths ($T_{80}$) which gives light transmissivity of 80% in a specimen of each glass having two polished surfaces and thickness of 10 mm. Results of the measurement show that $T_{80}$ of the glasses Nos. A and B of the Comparative Examples is 405–415 nm whereas $T_{80}$ of the glasses of the present invention is 380–395 nm which is shifted to the short wavelength side from the Comparative Examples, indicating that the glasses of the present invention are superior in light transmissivity to Nos. A and B of the Comparative Examples. As to No. C of the Comparative Examples, values of $T_{80}$ of the glasses of the present invention are substantially the same as values of $T_{80}$ of No. C.

The glasses of the present invention are excellent in their melting property, easy to homogenize and have good chemical durability.

TABLE 1

(in weight %)

| No. | Examples | | |
|---|---|---|---|
| | 1 | 2 | 3 |
| $SiO_2$ | 48.0 | 55.0 | 50.0 |
| $TiO_2$ | 21.6 | 25.5 | 23.5 |
| $Li_2O$ | | | |
| $Na_2O$ | 3.7 | 5.0 | 15.0 |
| $K_2O$ | 12.0 | 6.5 | 7.5 |
| MgO | | | |
| CaO | 4.0 | | 1.0 |
| SrO | | | |
| BaO | 10.5 | 8.3 | 2.8 |
| ZnO | | | |
| $Nb_2O_5$ | | | |
| $Al_2O_3$ | | | |
| $Al(PO_3)_3$ | | | |
| F | | | |
| $Sb_2O_3$ | 0.2 | 0.2 | 0.2 |
| $As_2O_3$ | | | |
| Nd | 1.63628 | 1.67434 | 1.62187 |
| νd | 38.2 | 34.4 | 35.7 |
| Liquid phase temp. (°C) | 925 | 910 | 910 |

(in weight %)

| No. | Examples | | |
|---|---|---|---|
| | 4 | 5 | 6 |
| $SiO_2$ | 50.0 | 53.0 | 54.0 |
| $TiO_2$ | 29.8 | 24.2 | 25.0 |
| $Li_2O$ | | | |
| $Na_2O$ | 7.5 | 8.8 | 5.3 |
| $K_2O$ | 7.5 | 9.0 | 10.0 |
| MgO | | | 0.5 |
| CaO | | | |
| SrO | | 2.5 | |
| BaO | 5.0 | 2.5 | 5.0 |
| ZnO | | | |
| $Nb_2O_5$ | | | |
| $Al_2O_3$ | | | |
| $Al(PO_3)_3$ | | | |
| F | | | |
| $Sb_2O_3$ | 0.2 | | 0.2 |
| $As_2O_3$ | | | |

TABLE 1-continued

| Nd | 1.66865 | 1.64450 | 1.62187 |
|---|---|---|---|
| νd | 33.8 | 33.9 | 37.9 |
| Liquid phase temp. (°C) | 950 | 908 | 921 |

(in weight %)

| No. | Examples | | | |
|---|---|---|---|---|
| | 7 | 8 | 9 | 10 |
| $SiO_2$ | 52.0 | 57.0 | 56.0 | 61.5 |
| $TiO_2$ | 25.0 | 22.0 | 22.5 | 21.0 |
| $Li_2O$ | | | | |
| $Na_2O$ | 4.8 | 7.8 | 9.5 | 7.3 |
| $K_2O$ | 10.0 | 8.0 | 7.0 | 5.0 |
| MgO | | | | |
| CaO | | | | |
| SrO | 8.0 | | | |
| BaO | | 5.0 | 3.3 | 5.0 |
| ZnO | | | 1.5 | |
| $Nb_2O_5$ | | | | |
| $Al_2O_3$ | | | | |
| $Al(PO_3)_3$ | | | | |
| F | | | | |
| $Sb_2O_3$ | 0.2 | 0.2 | 0.2 | 0.2 |
| $As_2O_3$ | | | | |
| Nd | 1.62867 | 1.63004 | 1.62034 | 1.62504 |
| νd | 37.8 | 35.3 | 36.0 | 36.9 |
| Liquid phase temp. (°C) | 930 | 880 | 905 | 886 |

(in weight %)

| No. | Comparative Examples | | |
|---|---|---|---|
| | A | B | C |
| $SiO_2$ | 49.5 | 40.0 | 50.0 |
| $TiO_2$ | 25.0 | 25.0 | 24.0 |
| $Li_2O$ | | | 11.0 |
| $Na_2O$ | | | |
| $K_2O$ | 20.0 | 21.5 | 15.0 |
| MgO | | | |
| CaO | | | |
| SrO | | | |
| BaO | | | |
| ZnO | | | |
| $Nb_2O_5$ | | 6.5 | |
| $Al_2O_3$ | 5.0 | | |
| $Al(PO_3)_3$ | | 7.0 | |
| F | 2.0 | | |
| $Sb_2O_3$ | | | |
| $As_2O_3$ | 0.5 | 0.5 | |
| Nd | 1.6142 | 1.6661 | 1.6462 |
| νd | 32.9 | 29.8 | 36.3 |
| Liquid phase temp. (°C) | 1025 | 1050 | 1090 |

What is claimed is:
1. An optical glass which consists essentially of:

| | |
|---|---|
| $SiO_2$ | 46–65% |
| $TiO_2$ | 21–30% |
| $Na_2O + K_2O$ | 10–30% |
| in which $Na_2O$ | 0–25% |
| $K_2O$ | 5–30% |
| MgO + CaO + SrO + BaO + ZnO | 2–15% |
| $As_2O_3$ up to | 1% |
| $Sb_2O_3$ up to | 1% |
| in which MgO | 0–4% |
| CaO | 0–4% |
| SrO | 0–4% |
| BaO | 0–15% |
| ZnO | 0–10% | and having a refractive index (Nd) of about 1.58–1.75 and having an Abbe number (νd) of about 28–45.